United States Patent
Perez et al.

(10) Patent No.: US 10,946,711 B2
(45) Date of Patent: Mar. 16, 2021

(54) VEHICLE TWIST AXLE ASSEMBLY

(71) Applicants: MAGNA INTERNATIONAL INC., Aurora (CA); Armando Perez, Rochester Hills, MI (US); Sreevidhya Anandavally, Rochester Hills, MI (US); John B. Johnson, Columbus, MI (US); Shiv Pareta, Troy, MI (US); Nicholas R. Samassa, Berkley, MI (US)

(72) Inventors: Armando Perez, Rochester Hills, MI (US); Sreevidhya Anandavally, Rochester Hills, MI (US); John B. Johnson, Columbus, MI (US); Shiv Pareta, Troy, MI (US); Nicholas R. Samassa, Berkley, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 74 days.

(21) Appl. No.: 16/317,553

(22) PCT Filed: Jul. 14, 2017

(86) PCT No.: PCT/US2017/042244
§ 371 (c)(1),
(2) Date: Jan. 13, 2019

(87) PCT Pub. No.: WO2018/013989
PCT Pub. Date: Jan. 18, 2018

(65) Prior Publication Data
US 2019/0255904 A1    Aug. 22, 2019

Related U.S. Application Data

(60) Provisional application No. 62/363,071, filed on Jul. 15, 2016.

(51) Int. Cl.
*B60G 21/05* (2006.01)
*E05F 15/652* (2015.01)
(Continued)

(52) U.S. Cl.
CPC .......... *B60G 21/051* (2013.01); *B60J 5/102* (2013.01); *E05F 15/652* (2015.01);
(Continued)

(58) Field of Classification Search
CPC .............. B60G 2200/23; B60G 21/051; B60G 2200/21; B60G 2206/20; B60G 21/05;
(Continued)

(56) References Cited

U.S. PATENT DOCUMENTS 5,813,691 A * 9/1998 Aoki .................... B60G 21/051
                                                    280/124.106
6,460,869 B1 * 10/2002 Tremouilles ......... B60G 21/051
                                                    280/124.116
(Continued)

FOREIGN PATENT DOCUMENTS

CN    103522864 A    1/2014
EP    2896522 A1    7/2015
(Continued)

OTHER PUBLICATIONS

EP Application No. 17828576.3 Extended European Search Report, dated Feb. 18, 2020, 8 pages.

*Primary Examiner* — Toan C To
(74) *Attorney, Agent, or Firm* — Dickinson Wright PLLC

(57) ABSTRACT

The twist axle assembly includes a pair of trailing arms that are spaced apart from one another in a first direction. The twist axle assembly also includes a twist beam, which has an open shaped cross-sectional shape, that extends in the first direction between a pair of opposing end portions. The open cross-sectional shape of the twist beam includes a base and
(Continued)

a pair of side walls. The end portions of the twist beam are fixedly attached with the trailing arms. A pair of beam reinforcements are fixedly attached with the trailing arms and with the base of the twist beam. The beam reinforcements are fixedly attached with the twist beam through at least one of fasteners, adhesives, resistance spot welding, cold metal transfer welding, laser welding, and brazing.

13 Claims, 13 Drawing Sheets

(51) Int. Cl.
*E05F 15/655* (2015.01)
*E05F 15/73* (2015.01)
*B60J 5/10* (2006.01)

(52) U.S. Cl.
CPC ............ *E05F 15/655* (2015.01); *E05F 15/73* (2015.01); *B60G 2200/20* (2013.01); *B60G 2200/21* (2013.01); *B60G 2206/20* (2013.01); *B60G 2206/8102* (2013.01); *B60G 2206/8201* (2013.01); *E05F 2015/767* (2015.01); *E05Y 2201/434* (2013.01); *E05Y 2900/546* (2013.01)

(58) Field of Classification Search
CPC ........ B60G 2206/014; B60G 2202/136; B60G 2206/8201; B60G 2206/8102; B60G 2200/20; B60J 5/102; E05F 15/652; E05F 15/655; E05F 15/73; E05F 2015/767; E05Y 2900/546; E05Y 2201/434

USPC .................................................. 280/124.128
See application file for complete search history.

(56) References Cited

U.S. PATENT DOCUMENTS

| | | | | |
|---|---|---|---|---|
| 7,204,498 | B2 * | 4/2007 | Alesso ................... | B60B 35/007 |
| | | | | 280/124.106 |
| 8,220,810 | B2 * | 7/2012 | Jakob ....................... | B60G 3/14 |
| | | | | 280/124.116 |
| 8,308,175 | B2 * | 11/2012 | Choi ..................... | B60G 21/051 |
| | | | | 280/124.106 |
| 10,549,596 | B2 * | 2/2020 | Lee ....................... | B60G 21/051 |
| 2007/0052194 | A1 * | 3/2007 | Marchel ............... | B60G 21/051 |
| | | | | 280/124.166 |
| 2010/0301579 | A1 | 12/2010 | Smith et al. | |
| 2012/0056469 | A1 | 3/2012 | Bubulka et al. | |
| 2012/0211961 | A1 | 8/2012 | Zhang et al. | |
| 2013/0214504 | A1 * | 8/2013 | Ohdo .................... | B60G 21/051 |
| | | | | 280/124.106 |
| 2017/0197487 | A1 * | 7/2017 | Langworthy ........ | B60G 21/053 |
| 2018/0029434 | A1 * | 2/2018 | Chelikani ............. | B60B 35/125 |
| 2018/0134316 | A1 * | 5/2018 | Klauke .................... | B32B 15/01 |
| 2018/0229575 | A1 * | 8/2018 | Chelikani ............... | B23P 15/00 |

FOREIGN PATENT DOCUMENTS

| | | |
|---|---|---|
| KR | 20070044570 A | 4/2007 |
| WO | 2014172437 A1 | 10/2014 |
| WO | 2016086291 A1 | 6/2016 |

* cited by examiner

VEHICLE TWIST AXLE ASSEMBLY

CROSS-REFERENCE TO RELATED APPLICATIONS

This U.S. National Stage Patent Application claims the benefit of PCT International Patent Application Serial No. PCT/US2017/042244 filed Jul. 14, 2017 entitled "Vehicle Twist Axle Assembly" which claims the benefit of and priority to U.S. Provisional Patent Application Ser. No. 62/363,071 filed Jul. 15, 2016 entitled "Vehicle Twist Axle Assembly," the entire disclosures of the applications being considered part of the disclosure of this application and hereby incorporated by reference.

BACKGROUND OF THE INVENTION

1. Field of the Invention

The present invention is related, generally, to twist axle assemblies of the type for use in vehicle suspension systems.

2. Related Art

A twist beam axle assembly, also known as a torsion beam axle, is a type of automobile suspension system including a pair of trailing arms, each of which is coupled with a wheel of a vehicle, and a twist beam which extends transversely between the trailing arms. During operation of the vehicle, the twist beam deforms in a twisting movement when one of the wheels moves relative to another, such as during vehicle body roll or when one of the vehicle's tires encounters a pothole or an obstacle in a road. The twisting movement of the twist beam absorbs this movement to make the ride more comfortable for occupants in the vehicle body and to keep the tires in contact with the road.

In some cases, one or more beam reinforcements are provided to strengthen and stiffen certain portions of the twist beam. These beam reinforcements are usually welded to the twist beam along a weld seam through a metal inert gas (MIG) welding operation.

There remains a significant and continuing need for an improved twist axle assembly which can be manufactured cost effectively and delivers improved performance and/or durability operating life.

SUMMARY OF THE INVENTION AND ADVANTAGES

One aspect of the present invention is related to a twist axle assembly for a suspension system of a vehicle. The twist axle assembly includes a pair of trailing arms that are spaced apart from one another in a first direction. The twist axle assembly also includes a twist beam, which has an open shaped cross-sectional shape, that extends in the first direction between a pair of opposing end portions. The open cross-sectional shape of the twist beam includes a base and a pair of side walls. The end portions of the twist beam are fixedly attached with the trailing arms. A pair of beam reinforcements are fixedly attached with the trailing arms and with the base of the twist beam. The beam reinforcements are fixedly attached with the twist beam through at least one of fasteners, adhesives, resistance spot welding, brazing, laser welding, and cold metal transfer (CMT) welding.

The use of fasteners, adhesives, resistance spot welding, and brazing, to fixedly attach the beam reinforcements with the twist beam eliminates, or at least substantially reduces, any heat affected zones on the twist beam. The reduction in the heat affected zones provides more consistent mechanical properties along the length of the twist beam, thereby improving the performance, durability, and operating life of the twist axle assembly. These improvements are realized at little to no additional cost as compared to other similar twist axle assemblies.

According to another aspect of the present invention, each of the beam reinforcements is also fixed with the twist beam through MIG welding. Because the MIG weld seam is complemented by the fasteners, adhesives, resistance spot weld, CMT welding, laser welding, and/or brazing, the heat affected zones from the MIG welding operation can be substantially reduced as compared to other known twist axle assemblies.

According to yet another aspect of the present invention, each of the beam reinforcements is fixedly attached with an associated one of the trailing arms through at least one of fasteners, adhesives resistance spot welding, and brazing.

According to still another aspect of the present invention, each of the beam reinforcements is also fixedly attached with an associated one of the trailing arms through MIG welding.

According to a further aspect of the present invention, the base of the twist body has a plurality of apertures that are spaced apart from one another in the first direction for receiving fasteners to fixedly attach beam reinforcements of different lengths with the twist beam.

According to yet a further aspect of the present invention, each of the twist beams has a similar open cross-sectional shape to the twist beam at a location where the beam reinforcement is fixedly attached with the twist beam.

According to still a further aspect of the present invention, the side walls of the beam reinforcement are fixedly attached with the side walls of the twist beam with adhesives, laser welding, CMT welding or brazing.

According to a further aspect of the present invention, each of the beam reinforcements extends at an angle relative to the first direction from a first end that is fixedly attached with the respective one of the trialing arms to the base of the twist beam.

Another aspect of the present invention is related to a method of making a twist axle assembly. The method includes the step of shaping a blank into a twist beam that extends in a first direction and that has an open cross-sectional shape, a pair of end portions and a middle portion. The method continues with the step of fixedly attaching the end portions of the twist beam with a pair of trailing arms. The method proceeds with the step of fixedly attaching a first end of a beam reinforcement, which is made as a separate piece from the twist beam, with one of the trailing arms. The method continues with the step of at least one of fastening, gluing, resistance spot welding, laser welding, CMT welding, and brazing a second end of the beam reinforcement with the twist beam to fixedly attach the beam reinforcement with the twist beam.

According to another aspect of the present invention, the method further includes the step of MIG welding the second end of the beam reinforcement with the twist beam.

According to yet another aspect of the present invention, the step of fixedly attaching the first end of the beam reinforcement with one of the trailing arms is further defined as at least one of fastening, gluing, resistance spot welding, laser welding, CMT welding, and brazing the first end of the beam reinforcement with one of the trailing arms.

According to still another aspect of the present invention, the method further includes the step of MIG welding the first end of the beam reinforcement with one of the trailing arms.

According to a further aspect of the present invention, the step of at least one of fastening, gluing, resistance spot welding, and brazing the second end of the beam reinforcement with the twist beam is further defined as inserting a fastener through the second end of the beam reinforcement and through one of a plurality of apertures in the twist beam, the plurality of apertures are spaced from one another in the first direction.

According to yet a further aspect of the present invention, each of the twist beam and the beam reinforcement has a pair of spaced apart side walls, and the method further includes the step of gluing or brazing the side walls of the beam reinforcement with side walls of the twist beam.

According to still a further aspect of the present invention, the step of shaping the blank into the twist beam is further defined as roll forming or stamping the blank into the twist beam.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
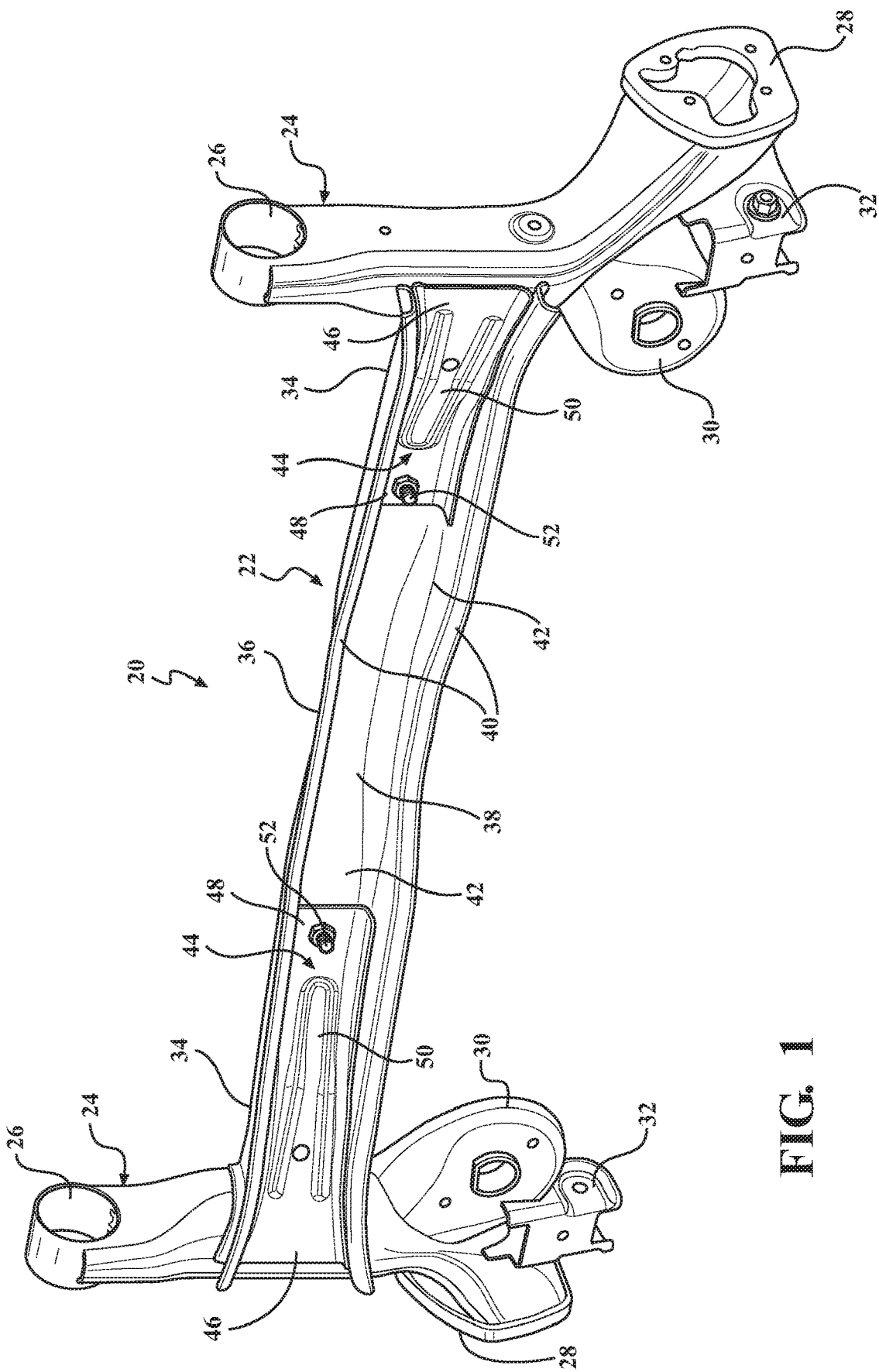
FIG. 1 is a top elevation view of a first exemplary embodiment of a twist axle assembly.

Referring to the Figures, wherein like numerals indicate corresponding parts throughout the several views, a first exemplary embodiment of an improved twist axle assembly 20 for use in a vehicle suspension system of a vehicle is generally shown in FIGS. 1-4. The twist axle assembly 20 includes a twist beam 22 (also known as a cross-member or a cross-beam) and a pair of trailing arms 24. The twist beam 22 extends in a first direction (hereinafter referred to as a "lateral direction") between opposite ends which are fixedly attached with the trailing arms 24. The trailing arms 24 are operatively attached with wheel assemblies (not shown), and, during operation of the vehicle, the twist beam 22 resiliently and elastically twists to absorb energy and resist relative rotation of the trailing arms 24 to improve the handling of the vehicle by maintaining the vehicle's tires in contact with a road surface.

In the exemplary embodiment, each of the trailing arms 24 has a trailing arm body that extends along a second direction from a bushing sleeve 26 to a spindle plate 28. The bushing sleeve 26 is configured to receive a bushing (not shown) for attaching the trailing arm 24 with a vehicle body (not shown), and the spindle plate 28 is configured to attach with a wheel (not shown) of a wheel assembly. Each trailing arm 24 also has a spring mount 30, which is configured to engage a engage one end of a coil spring (not shown), and a shock bracket 32, which is configured to engage one end of a shock absorber (not shown). Each trailing arm 24 is preferably made as a single, monolithic piece of metal, such as steel or alloy steel. However, it should appreciated that the trailing arms 24 may be made as multiple pieces that are coupled together and me made of any suitable material or materials. It should also be appreciated that the shapes of the trailing arms 24 could vary greatly from those of the exemplary embodiment, depending on the vehicle for which the twist axle assembly 20 is designed.

Figure 2:
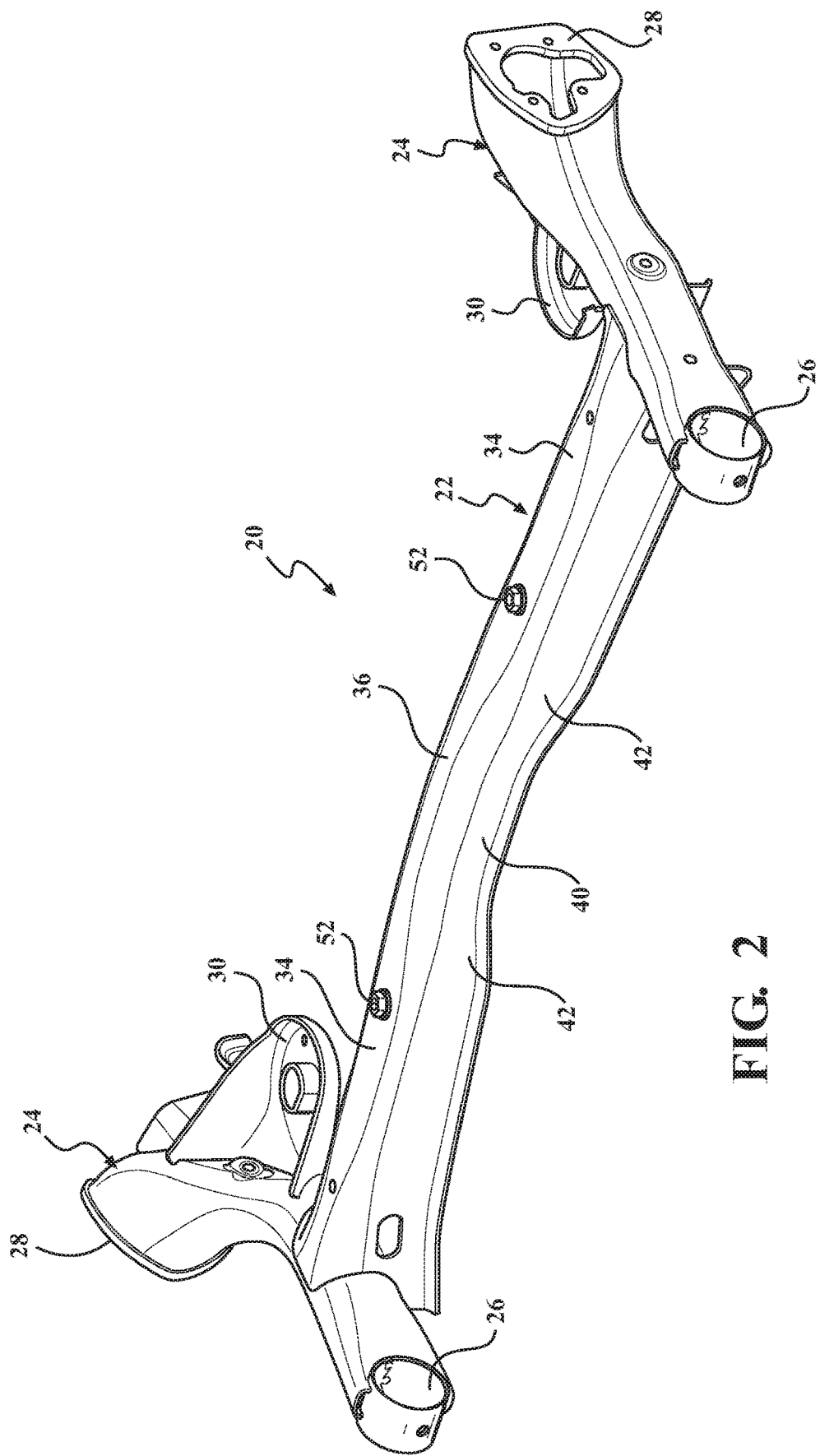
FIG. 2 is a perspective and elevation view of the twist axle assembly of FIG. 1.
Figure 3:
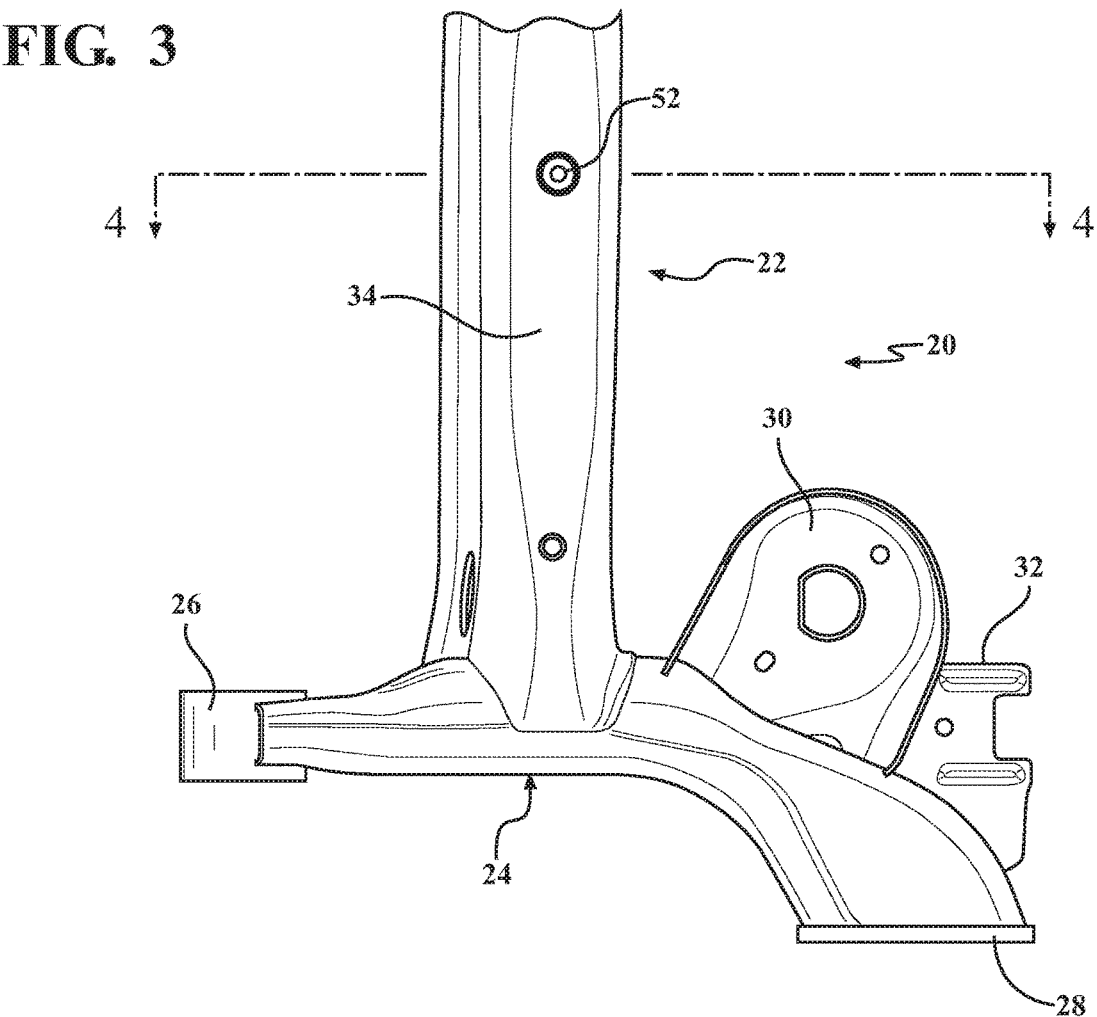
FIG. 3 is a top fragmentary view of the twist axle assembly of FIG. 1.
Figure 4:
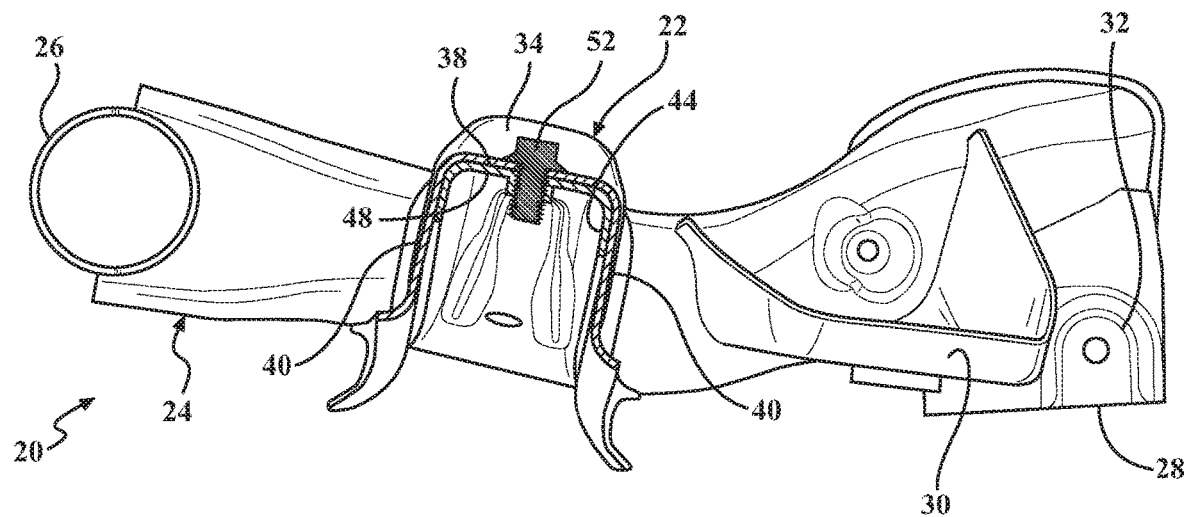
FIG. 4 is a cross-sectional view of the twist axle assembly of FIG. 1 taken through Line 4-4 of FIG. 3.
Figure 5:
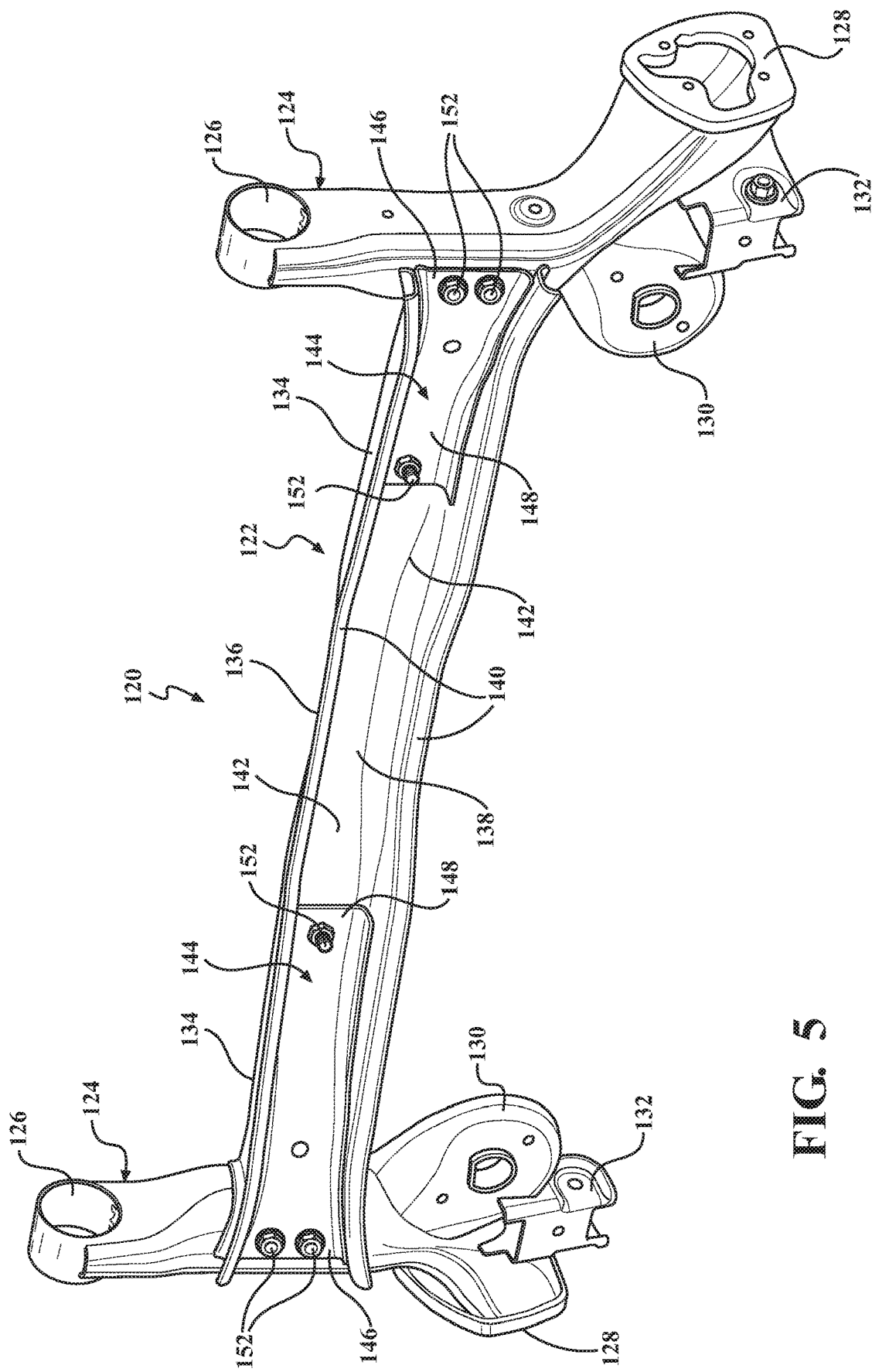
FIG. 5 is a perspective and elevation view of a second exemplary embodiment of a twist axle assembly.
Figure 6:
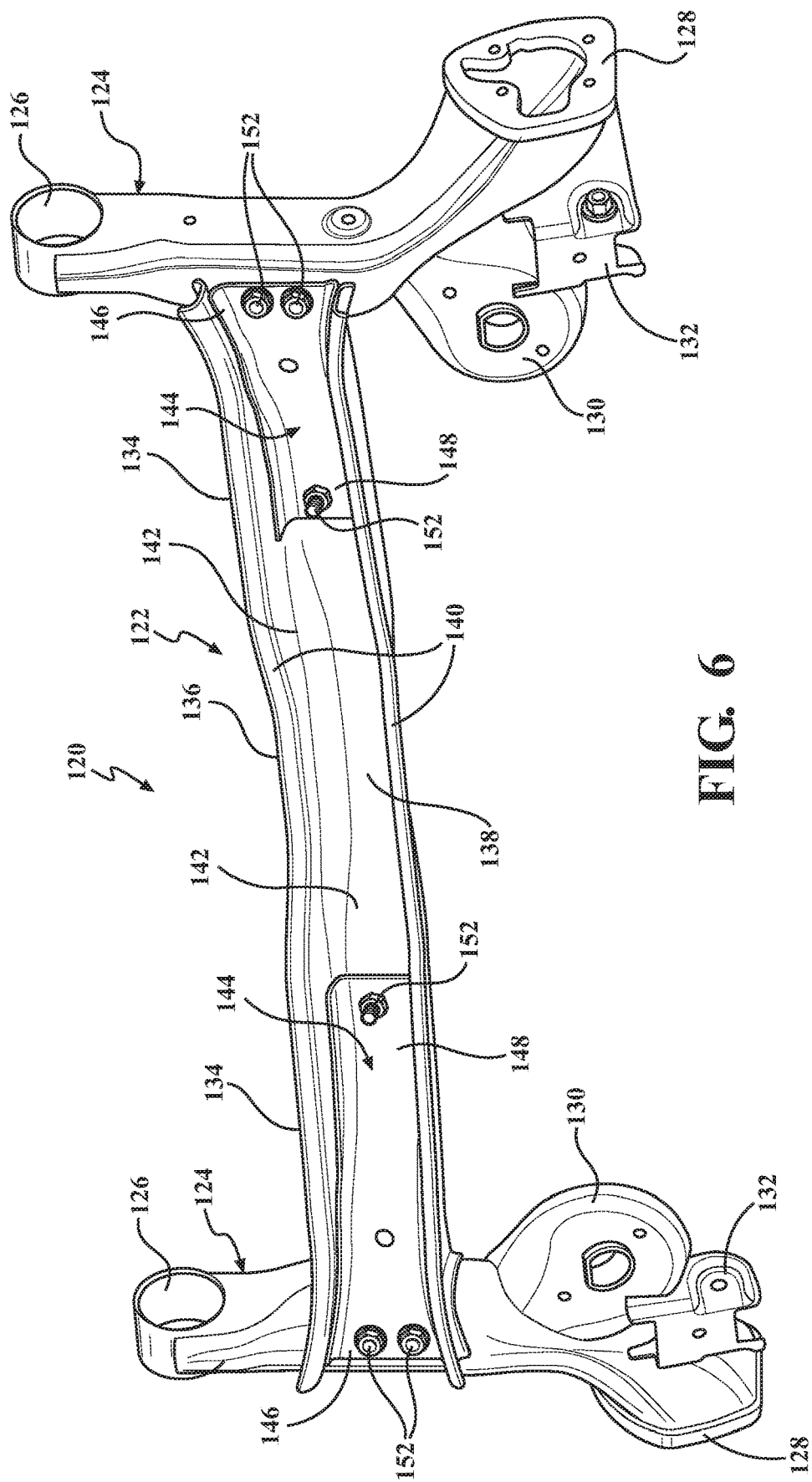
FIG. 6 is another perspective and elevation view of the twist axle assembly of FIG. 5 taken from a different perspective than FIG. 5.
Figure 7:
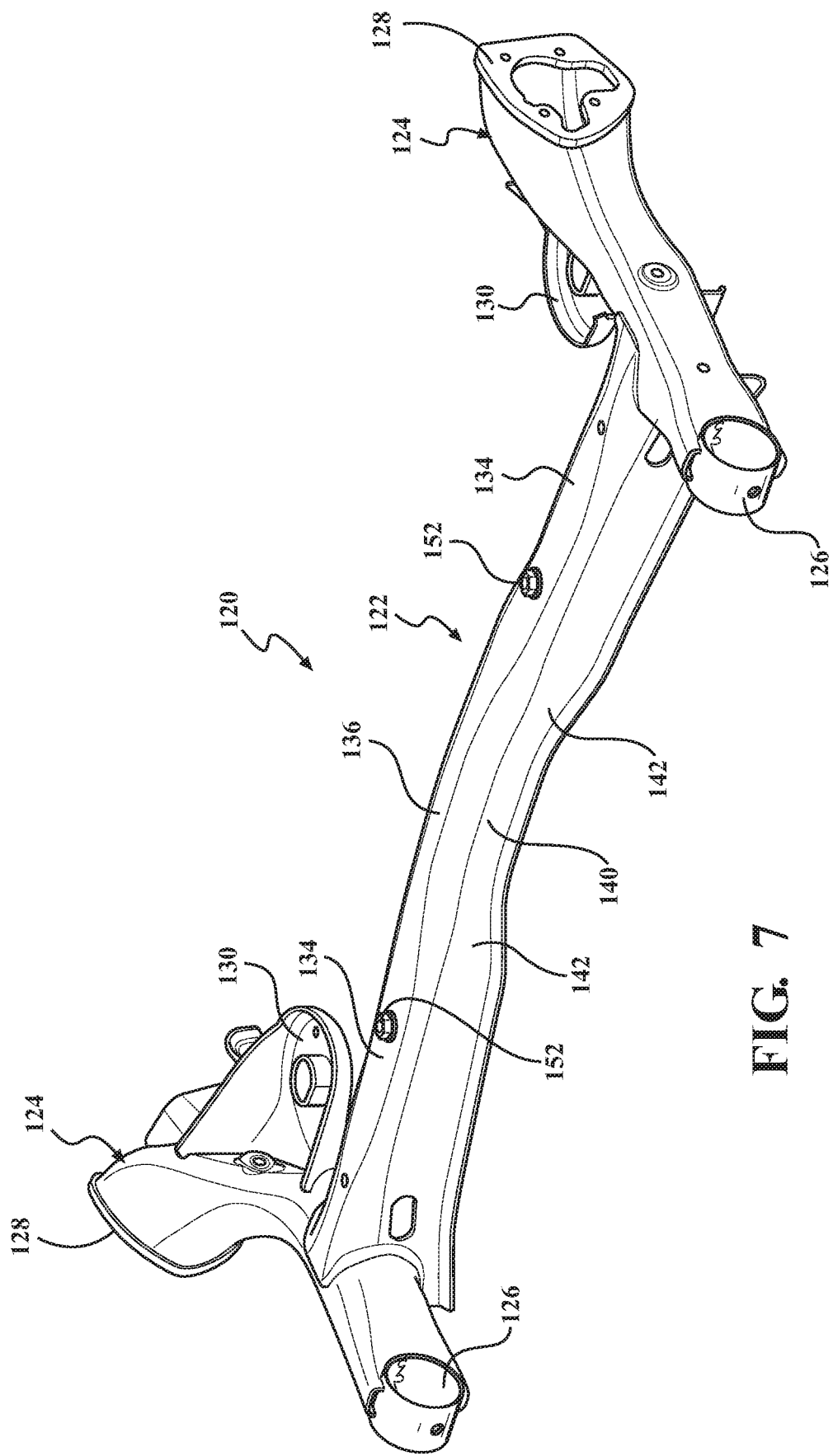
FIG. 7 is yet another perspective and elevation view of the twist axle assembly of FIG. 5 and taken from a different perspective than FIGS. 5 and 6.
Figure 8:
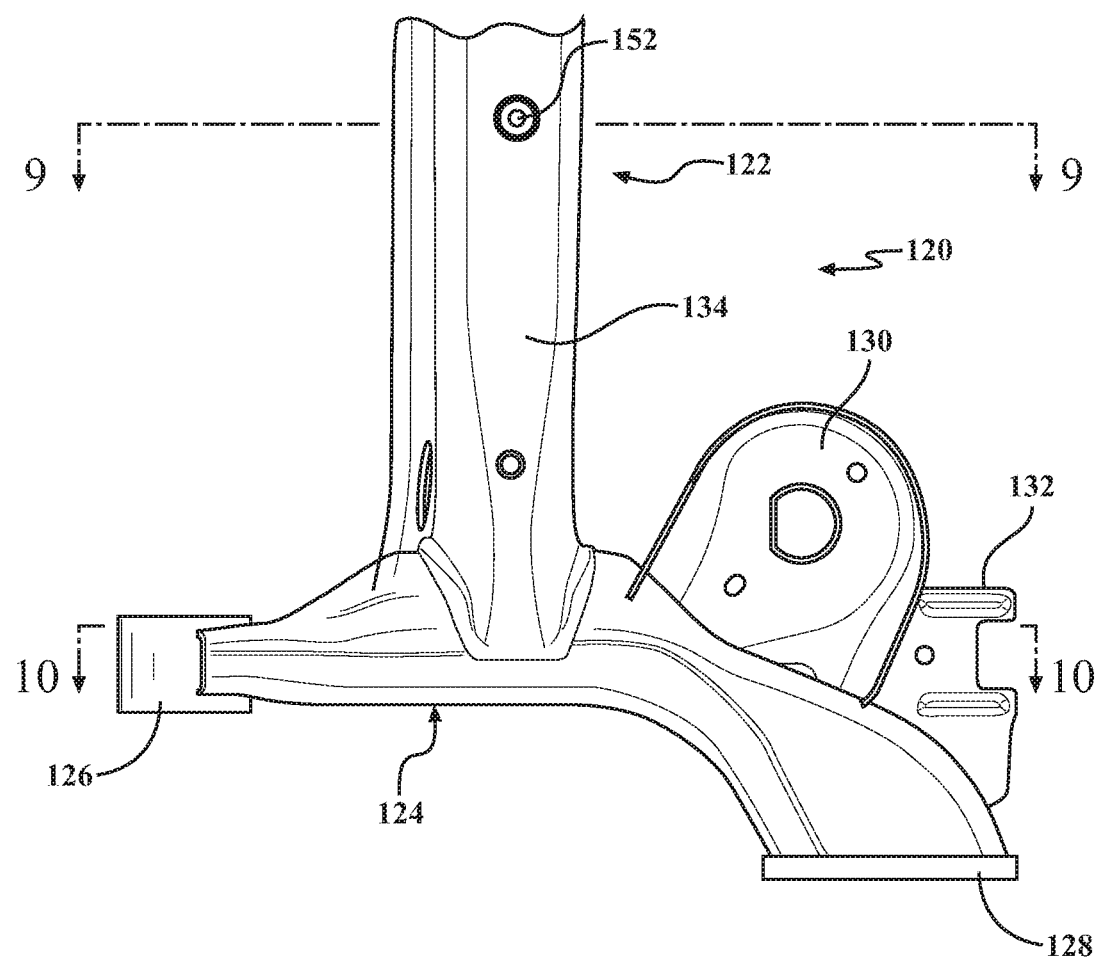
FIG. 8 is a top fragmentary view of the twist axle assembly of FIG. 5.
Figure 9:
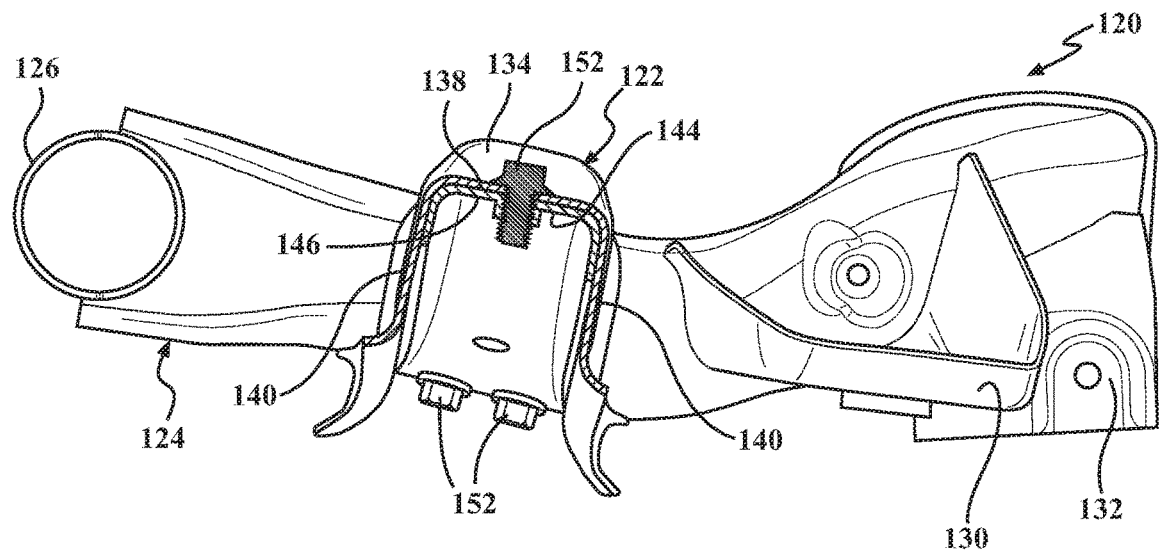
FIG. 9 is a cross-sectional view of the twist axle assembly of FIG. 5 taken through Line 9-9 of FIG. 8.
Figure 10:
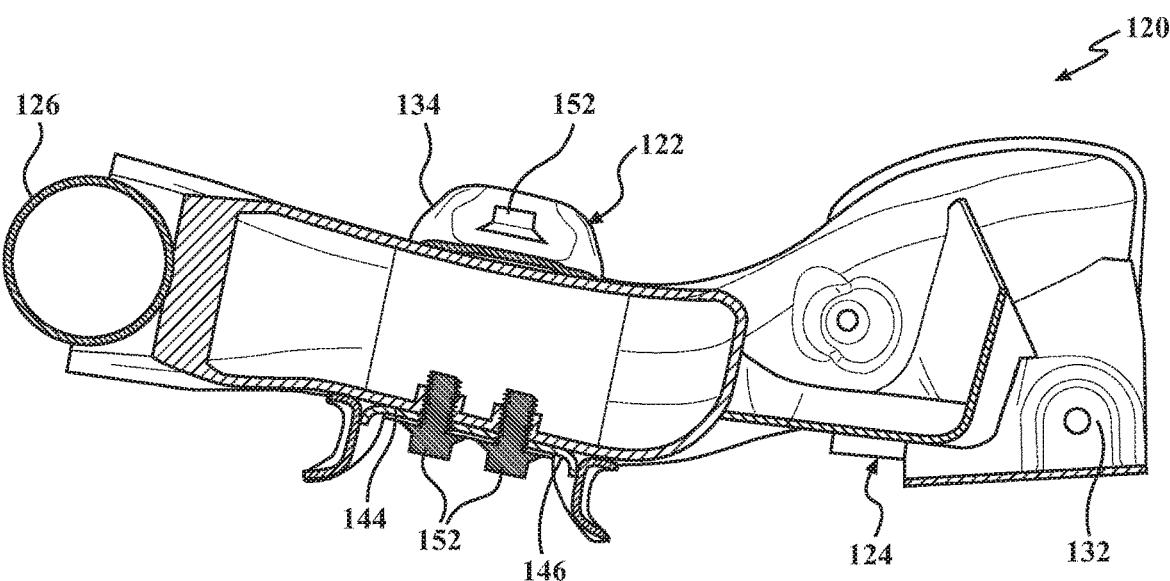
FIG. 10 is another cross-sectional view of the twist axle assembly of FIG. 5 taken through Line 10-10 of FIG. 8.
Figure 11:
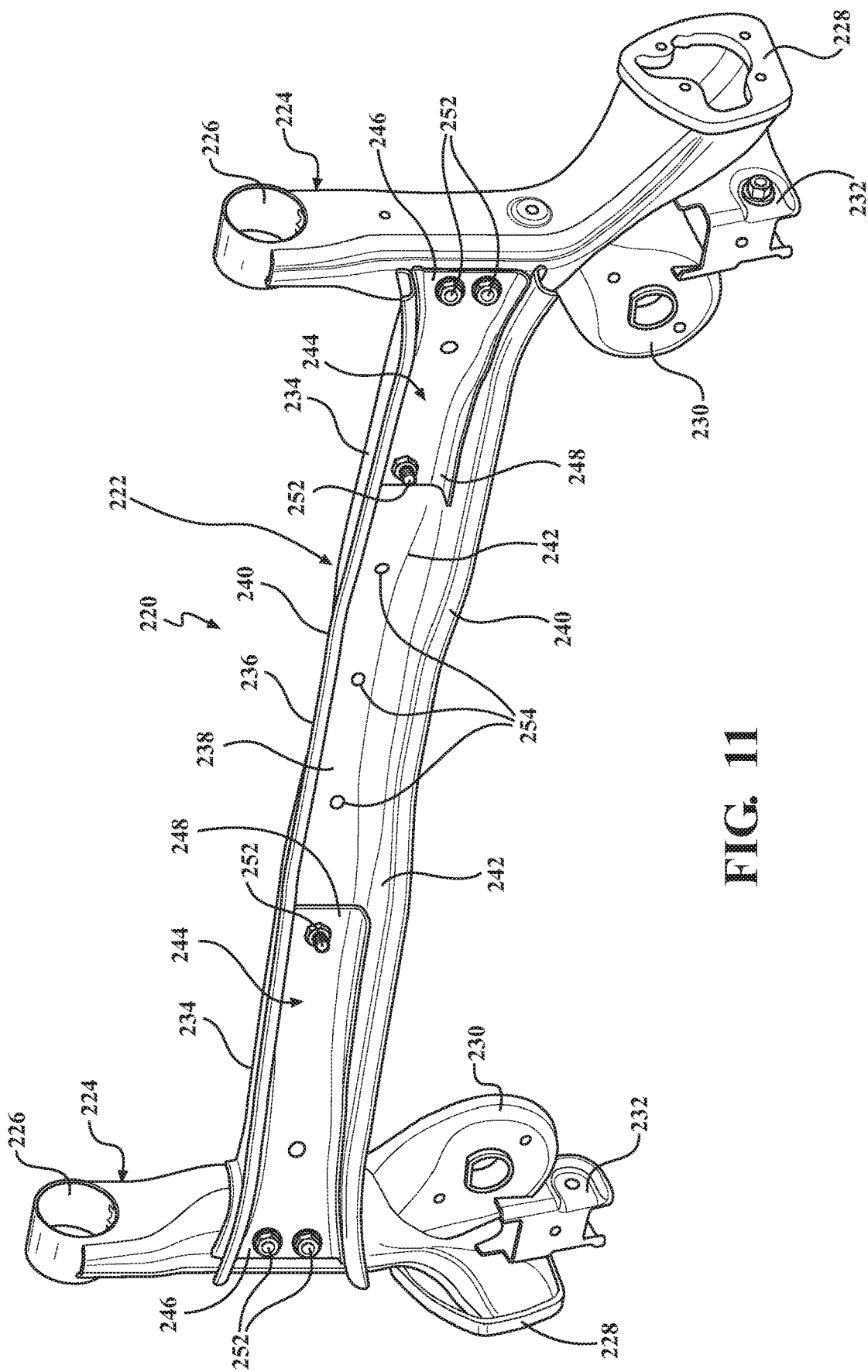
FIG. 11 is a perspective and elevation view of a third exemplary embodiment of a twist axle assembly.
Figure 12:
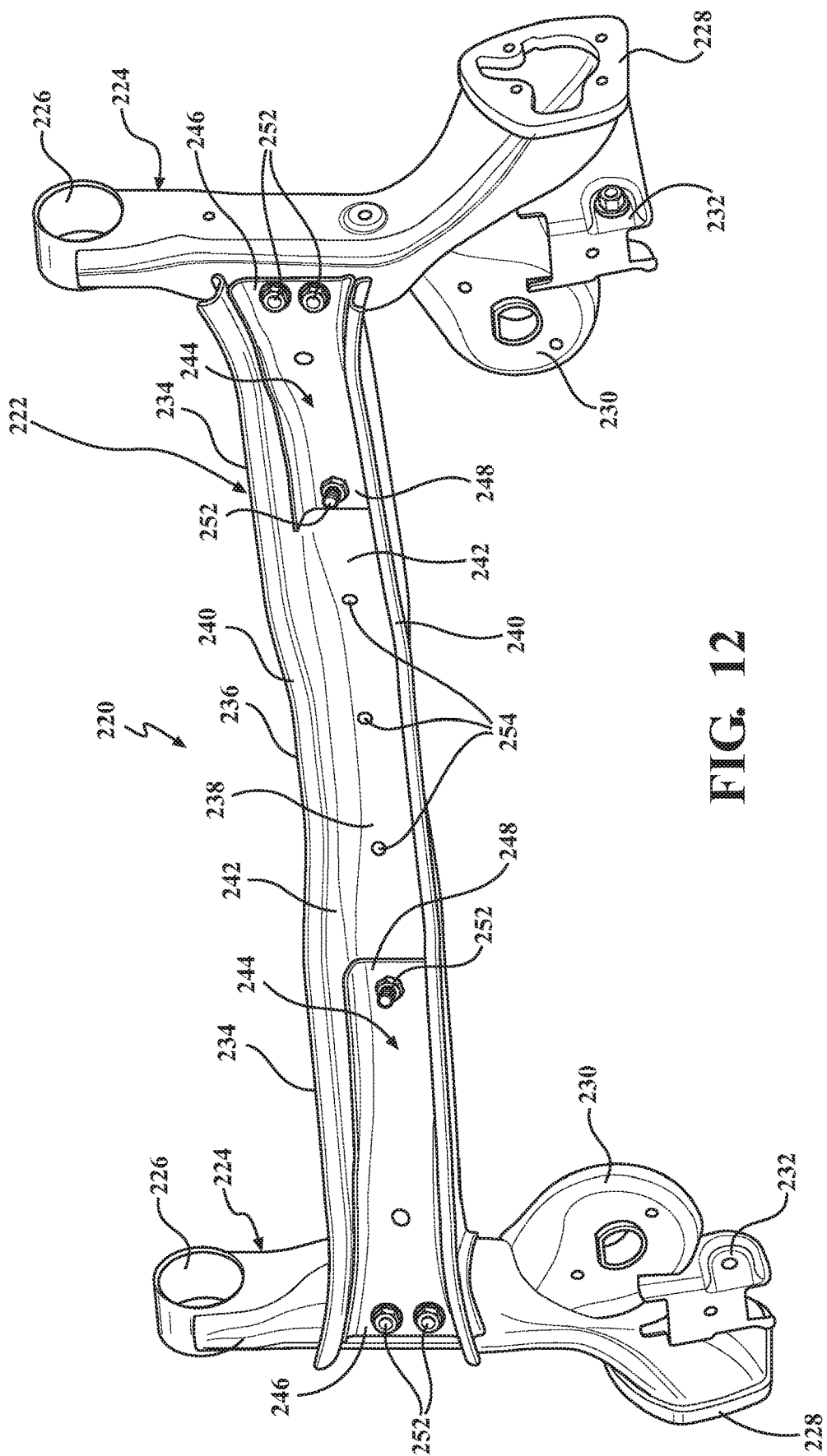
FIG. 12 is another perspective and elevation view of the twist axle assembly of FIG. 11 and taken from a different perspective than FIG. 11.
Figure 13:
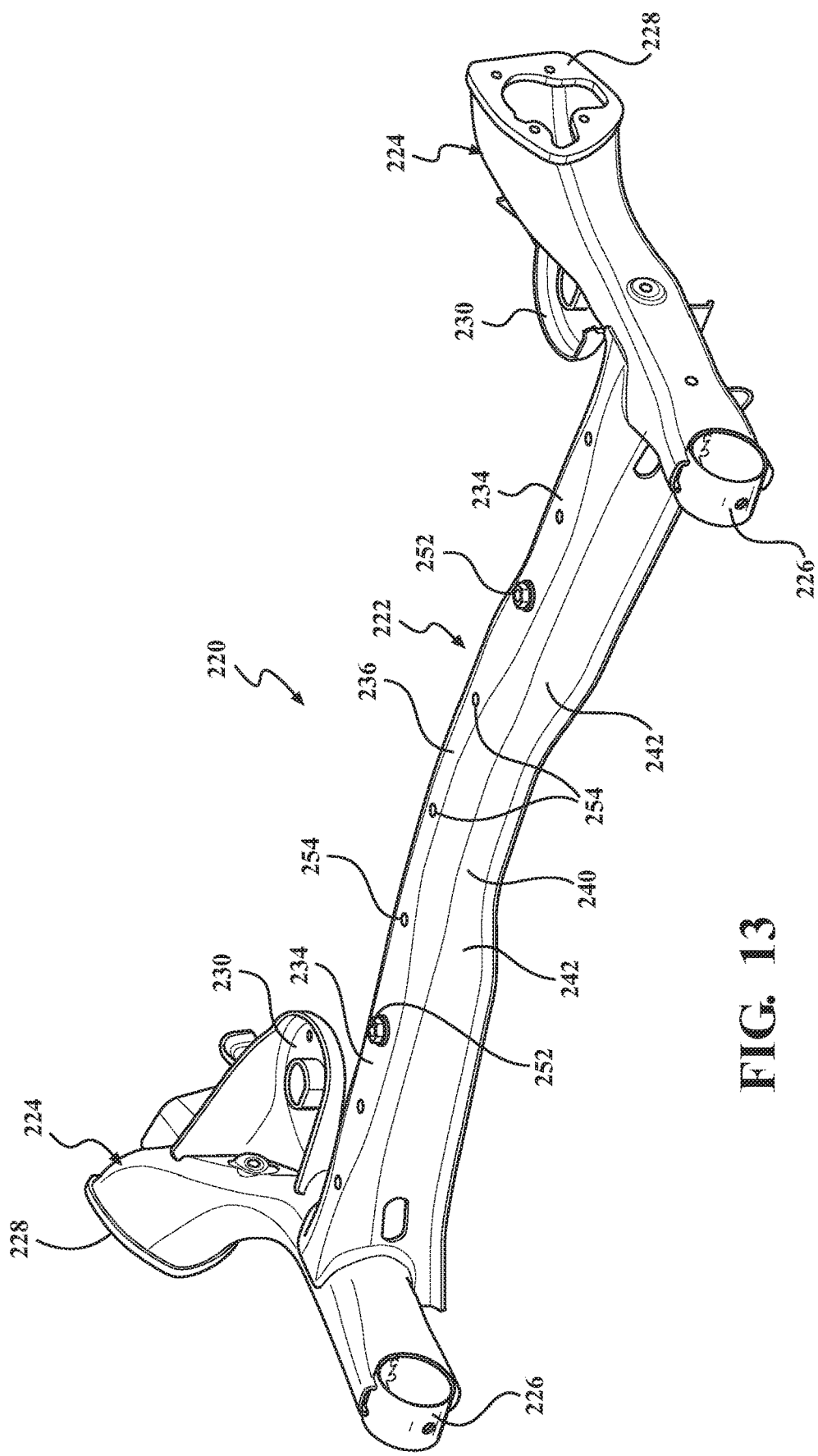
FIG. 13 is yet another perspective and elevation view of the twist axle assembly of FIG. 11 and taken from a different perspective than FIGS. 11 and 12.
Figure 14:
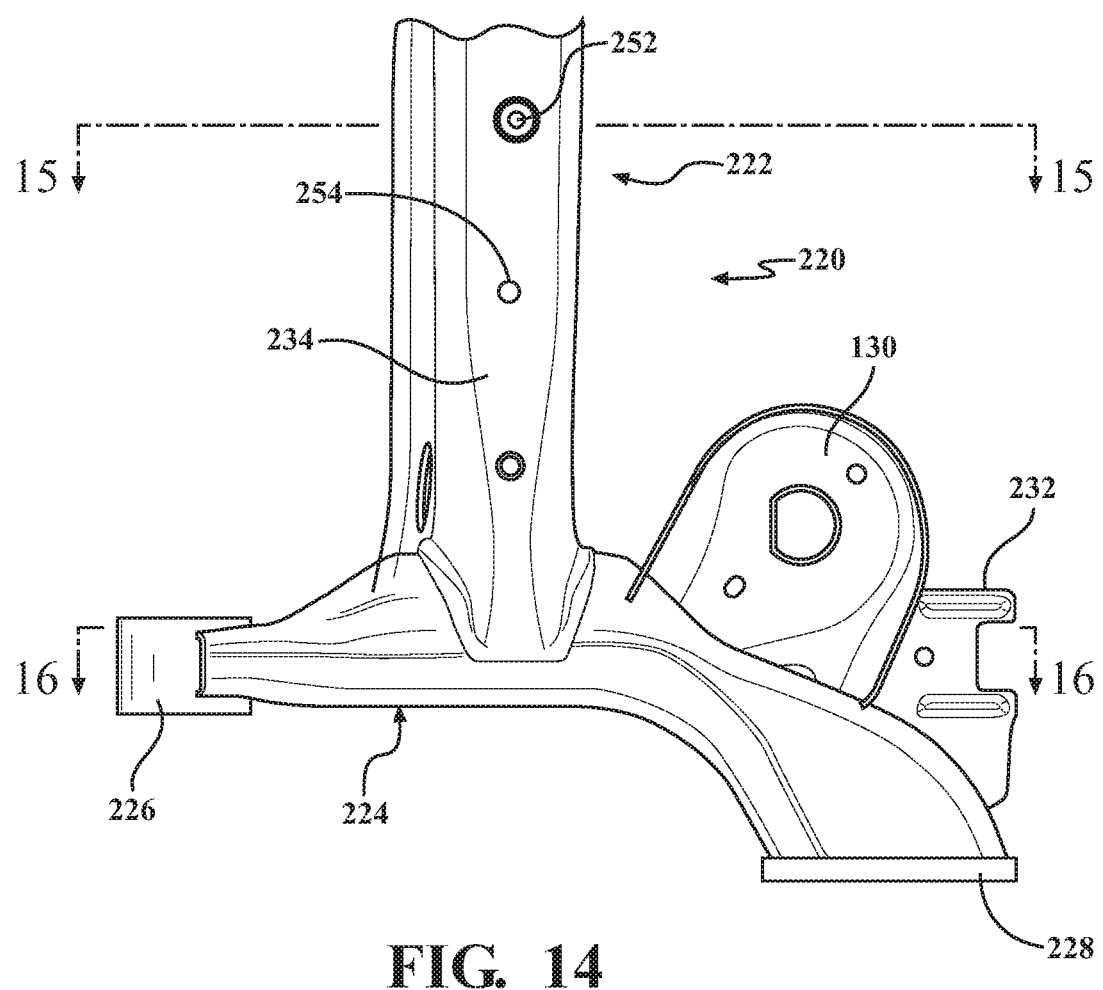
FIG. 14 is a top fragmentary view of the twist axle assembly of FIG. 11.
Figure 15:
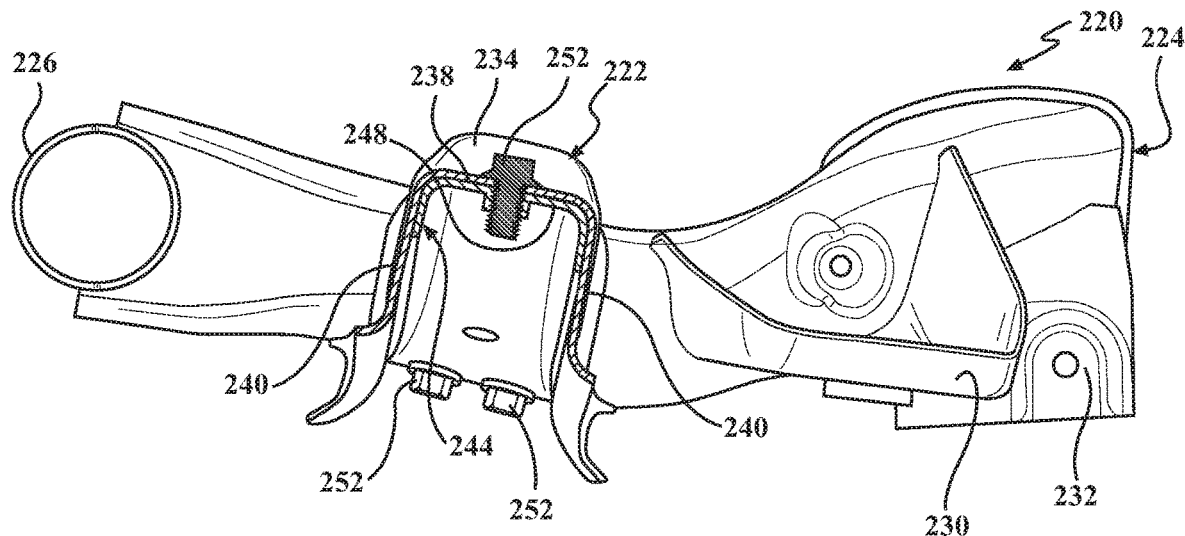
FIG. 15 is a cross-sectional view of the twist axle assembly of FIG. 11 taken through Line 15-15 of FIG. 14.
Figure 16:
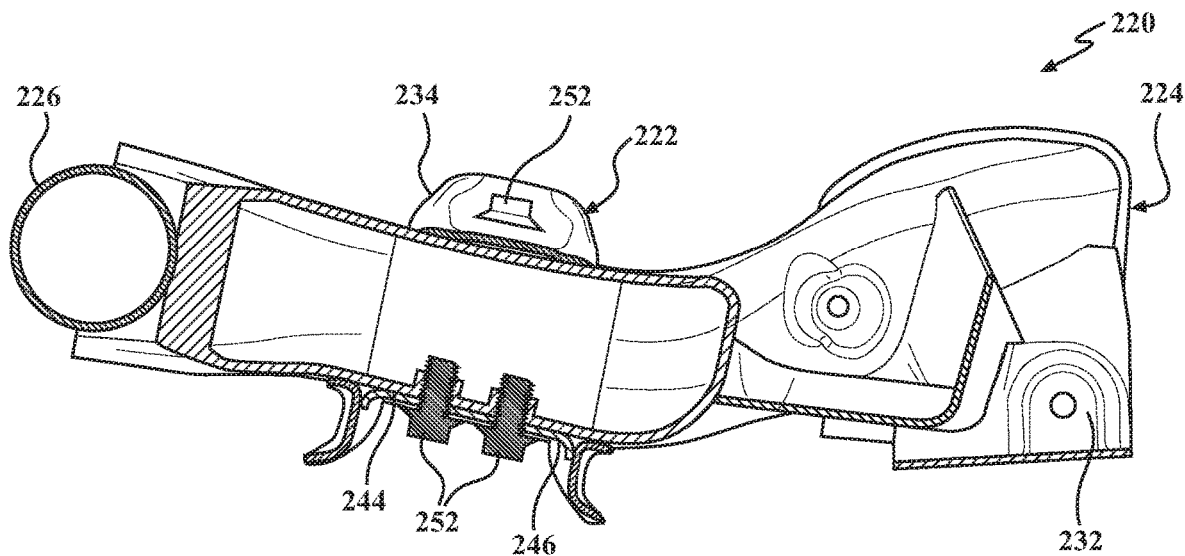
FIG. 16 is another cross-sectional view of the twist axle assembly of FIG. 11 taken through Line 16-16 of FIG. 14.

The twist beam 22 has a pair of opposite end portions 34 and a middle portion 36 which extends in the lateral direction between the end portions 34. As shown in FIG. 2, each of the end portions 34 has a generally U-shaped cutout which engaged around a portion of one of the trailing arms 24 in a so-called "glove-style" connection. The U-shaped cutouts are preferably shaped to match the outer profiles of the trailing arms 24 to maximize surface-to-surface contact between the twist beam 22 and the trailing arms 24. The end portions 34 are preferably welded, for example through metal inert gas (MIG) welding, to the trailing arms 24.

In the exemplary embodiment, the twist beam 22 has an open cross-sectional shape along at least substantially its entire length. Specifically, as viewed in cross-section taken through a plane that extends perpendicularly to the lateral direction, the twist beam 22 has a base 38 (or bottom wall) and a pair of spaced apart side walls 40 that extend parallel with one another transversely away from the base 38 to present a laterally extending channel which is bounded on three sides by the base 38 and the side walls 40. The upper ends of the side walls 40 are flared outwardly (i.e., away from one another) to increase the torsional stiffness of the twist beam 22. The twist beam 22 is preferably made as a single, monolithic piece of steel or a steel alloy. However, it should be appreciated that any suitable metal or material may be employed. The twist beam 22 is preferably shaped through stamping and/or roll forming from a blank. However, it should be appreciated that any suitable process or combination of processes may be employed.

In the first exemplary embodiment, the twist beam 22 has an hour glass shape in that it has a reduced width and height in the middle portion 36 as compared to the end portions 34. The reduced width and height dimensions reduces the torsional stiffness of the twist beam 22 in the middle portion 36 to encourage the majority of the elastic twisting to occur in this middle portion 36. The twist beam 22 also has a pair of transition portions 42 which increase in width and height from the middle portion 36 to the respective end portions 34 such that the torsional stiffness of the twist beam 22 increases gradually from the middle portion 36 to the end portions 34.

The twist axle assembly 20 also includes a pair of beam reinforcements 44 which are made as separate pieces from the twist beam 22 for reinforcing and increasing the torsional stiffnesses of the end portions 34. Each beam reinforcement 44 ramps from an upper end 46 that is fixedly attached with the trailing arm 24 to a lower end 48 that is fixedly attached with the base 38 of the twist beam 22. That is, each beam reinforcement 44 extends at an angle relative to the first direction from the upper end 46 to the lower end 48. Each beam reinforcement 44 also has a rib 50 in the area of the ramping. The ramping of the beam reinforcement 44 gradually increases the torsional stiffness of the end portions 34 from the transition portions 42 to the trailing arms 24.

Like the twist beam 22, the lower end 48 of each beam reinforcement 44 is generally U-shaped and is nested in the channel of the end portion 34 of the twist beam 22. Specifically, the base of each beam reinforcement 44 overlying the base 38 of the twist beam 22 and with the side walls of each beam reinforcement 44 being in surface-to-surface contact with inner surfaces of the side walls 40 of the twist beam 22.

The beam reinforcements 44 are preferably made of elastically deformable metal, such as steel or alloy steel. However, it should be appreciated that any suitable metal or other material may be employed. The beam reinforcements 44 may be shaped through any suitable process or combination of processes including, for example, stamping or roll forming from a metal blank.

The lower end 48 of each of the beam reinforcements 44 is fixedly attached with the base 38 of the twist beam 22 through at least one of fasteners, adhesives, resistance spot welding, and brazing. In the first exemplary embodiment, the fastener 52 is in the form of a single nut and bolt. However, it should be appreciated that rivets or other types of fasteners could be employed. Preferably, the side walls of the beam reinforcements 44 are fixedly attached with the side walls 40 of the twist beam 22 through adhesives, CMT, brazing, laser welding and/or MIG welding. In the case of MIG welding, since the weld seam is constrained to the joint between the side walls 40 of the twist beam 22, the overall heat affected zone in the twist beam 22 is minimized. In the case of CMT, no heat affected zone will be created, and any heat affected zone from laser welding will be negligible.

Additionally, the upper and lower ends 46, 48 of each of the beam reinforcements 44 are MIG welded to the base 38 of the twist beam 22. Because the MIG weld seam between the lower end of the beam reinforcement 44 and the base 38 of the twist beam 22 is complemented by the use of fasteners, adhesives, resistance spot welding, CMT welding, laser welding and/or brazing, the strength of the weld seam from the MIG welding does not have to be as strong as it is in other known twist axle assemblies. In the case of laser welding, a filler material may or may not be used. The reduced heat affected zone improves the performance, durability and operating life of the twist axle assembly 20, and these improvements are realized with minimal, if any, additional cost.

Additionally, the performance of the twist axle assembly 20 can be tuned by selecting different shapes of the beam reinforcements 44 such that the same twist beam 22 can be manufactured for use in twist axle assemblies 20 for different vehicles with different torsional stiffness profiles. This further reduces the cost of each twist axle assembly 20 through economies of scale.

Referring now to FIGS. 5-10, a second exemplary embodiment of a twist axle assembly 120 is generally shown with like numerals, separated by a prefix of "1", indicating corresponding parts with the first exemplary embodiment described above. In the second exemplary embodiment of the twist axle assembly 120, a pair of fasteners 152 fixedly attach the upper ends 146 of the beam reinforcements 144 with the trailing arms 124. In this embodiment, since the fasteners 152 complement the MIG weld seams between the beam reinforcements 144 and the trailing arms 124, the heat affected zones of these MIG weld seams may also be reduced in size to further improve the performance, durability and operating life of the twist axle assembly 120.

Referring now to FIGS. 11-16, a third exemplary embodiment of a twist axle assembly 220 is generally shown with like numerals, separated by a prefix of "2", indicating corresponding parts with the above-described embodiments. In the third exemplary embodiment, the twist beam 222 is provided with a plurality of apertures 254 which are spaced from one another in the lateral direction. The apertures 254 allow the twist beam 222 to be more easily joined with beam reinforcements 244 of different lengths by simply aligning the aperture in the respective beam reinforcement 244 with the appropriate one of the apertures 254 on the twist beam 222. This allows the twist axle assembly 220 to be more simply tailored for use with different vehicle platforms by choosing the appropriate beam reinforcement 240. The use of the same trailing arms 224 and twist beam 220 across different vehicle platforms provides for cost savings through economies of scale.

Another aspect of the present invention is related to a method of making a twist axle assembly 20, such as any of the first, second and third exemplary embodiments of the twist axle assembly discussed above. The method includes the step of shaping, preferably through roll forming or stamping, a blank into the twist beam 22. The method continues with the step of fixedly attaching the end portions 34 of the twist beam 22 with the trailing arms 24. The method proceeds with the step of fixedly attaching the upper ends 46 of the beam reinforcements 44 with the trailing arms 24. Preferably, the upper ends 46 of the beam reinforcements 44 are fastened, glued, resistance spot welded and/or brazed with the trailing arms 24 and are MIG welded with the trailing arms 24. The method continues with the step of at least one of fastening, gluing, resistance spot welding, laser welding, CMT welding and brazing the lower ends 48 of the beam reinforcements 44 with the base 38 of the twist beam 22 to fixedly attach the beam reinforcements 44 with the twist beam 22.

The use of orientation terms, such as "top", "bottom" and side", herein are in reference to the orientations of the features in one or more of the drawings, and these terms are not meant to require a particular orientation or otherwise be limiting in nature.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A twist axle assembly for a vehicle, comprising:
a pair of trailing arms spaced from one another in a first direction;
a twist beam having an open cross-sectional shape, said twist beam extending in said first direction between a pair of opposing end portions;
said open cross-sectional shape including a base and a pair of side walls;
said end portions of said twist beam being fixedly attached with said trailing arms;
a pair of beam reinforcements fixedly attached with said trailing arms and with said base of said twist beam;
each of said beam reinforcements being fixedly attached with said twist beam through at least one of fasteners, adhesives, resistance spot welding, cold metal transfer welding, laser welding, and brazing; and
wherein said base of said twist body has a plurality of apertures spaced from one another in said first direction for receiving fasteners to fixedly attach beam reinforcements of different lengths to said twist beam.

2. The twist axle assembly as set forth in claim 1, wherein each of said beam reinforcements is also fixedly attached with said twist beam through metal inert gas welding.

3. The twist axle assembly as set forth in claim 1, wherein each of said beam reinforcements is fixedly attached with an associated one of said trailing arms through at least one of fasteners, adhesives, resistance spot welding, brazing, laser welding and cold metal transfer welding.

4. The twist axle assembly as set forth in claim 3, wherein each of said beam reinforcements is also fixedly attached with an associated one of said trailing arms through metal inert gas welding.

5. The twist axle assembly as set forth in claim 1 wherein each of said beam reinforcements has a similar cross-sectional shape to said twist beam at a location where said beam reinforcement is fixedly attached with said twist beam.

6. The twist axle assembly as set forth in claim 5 wherein side walls of each of said beam reinforcements are fixedly attached with said side walls of said twist beam with, laser welding, metal inert gas welding, adhesives or brazing.

7. The twist axle assembly as set forth in claim 1 wherein each of said beam reinforcements extends at an angle relative to said first direction from a first end that is fixedly attached with the respective one of said trailing arms to said base of said twist beam.

8. A method of making a twist axle assembly, comprising the steps of:
shaping a blank into a twist beam that extends in a first direction and that has an open cross-sectional shape and has a pair of end portions and a middle portion;
fixedly attaching the end portions of the twist beam with a pair of trailing arms;
fixedly attaching a first end of a beam reinforcement, which is made as a separate piece from the twist beam, with one of the trailing arms; and
inserting a fastener through a second end of the beam reinforcement and through one of a plurality of apertures in the twist beam, the plurality of apertures being spaced from one another in the first direction to fixedly attach the beam reinforcement with the twist beam.

9. The method as set forth in claim 8 further including the step of metal inert gas welding the second end of the beam reinforcement with the twist beam.

10. The method as set forth in claim 8 wherein the step of fixedly attaching the first end of the beam reinforcement with one of the trailing arms is further defined as at least one of fastening, gluing, resistance spot welding, brazing, laser welding, and cold metal transfer welding the first end of the beam reinforcement with one of the trailing arms.

11. The method as set forth in claim 10 further including the step of metal inert gas welding the first end of the beam reinforcement with one of the trailing arms.

12. The method as set forth in claim 8 wherein each of the twist beam and the beam reinforcement has a pair of spaced apart side walls, and further including the step of gluing or brazing the side walls of the beam reinforcement with side walls of the twist beam.

13. The method as set forth in claim 8 wherein the step of shaping the blank into the twist beam is further defined as roll forming or stamping the blank into the twist beam.

* * * * *